Jan. 1, 1929.  
B. BRANDENBURG  
1,697,411  
DIRECTION INDICATOR FOR MOTOR VEHICLES  
Filed April 19, 1928     2 Sheets-Sheet 1
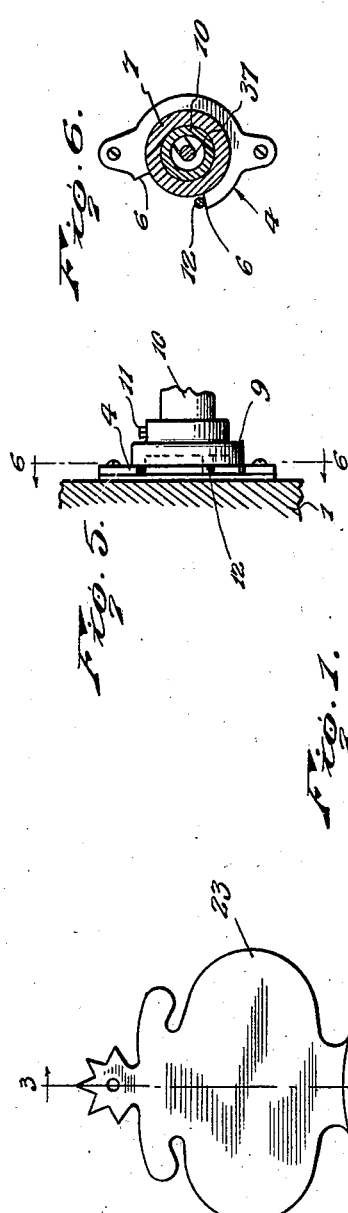
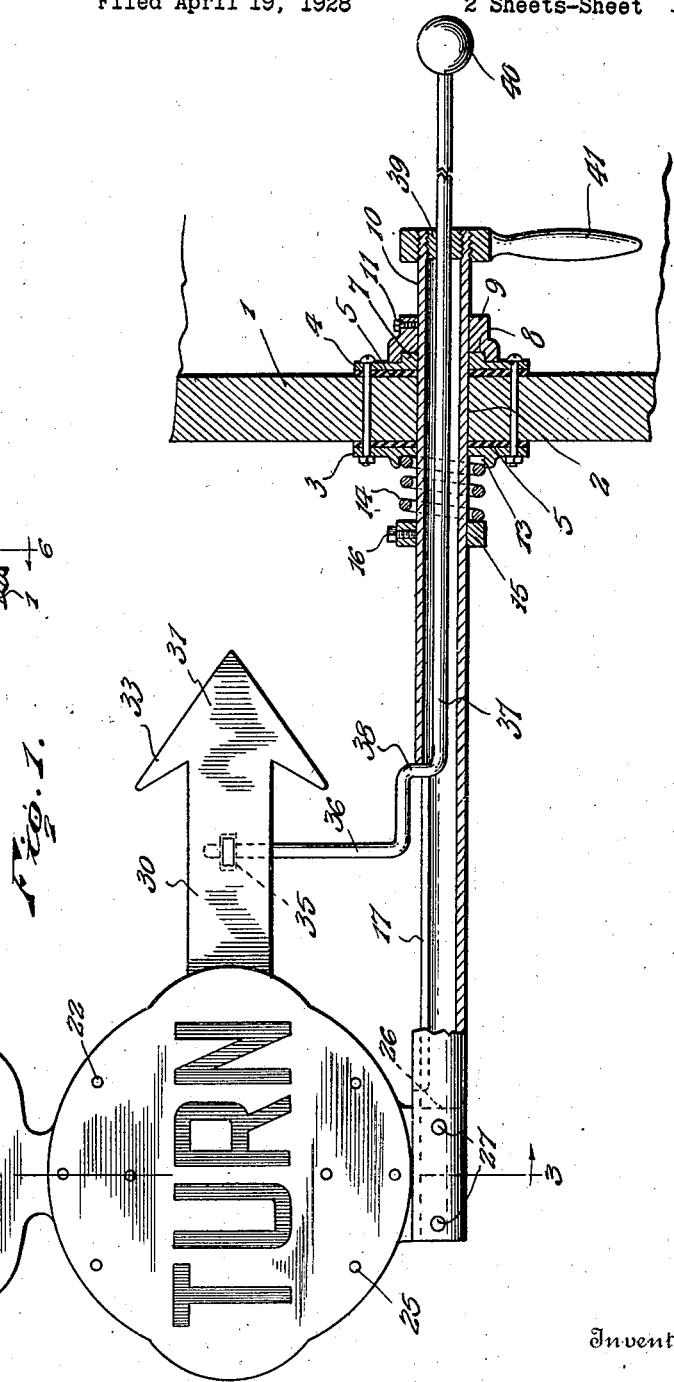
Inventor  
Bertha Brandenburg.  
By Lacy & Lacy, Attorneys

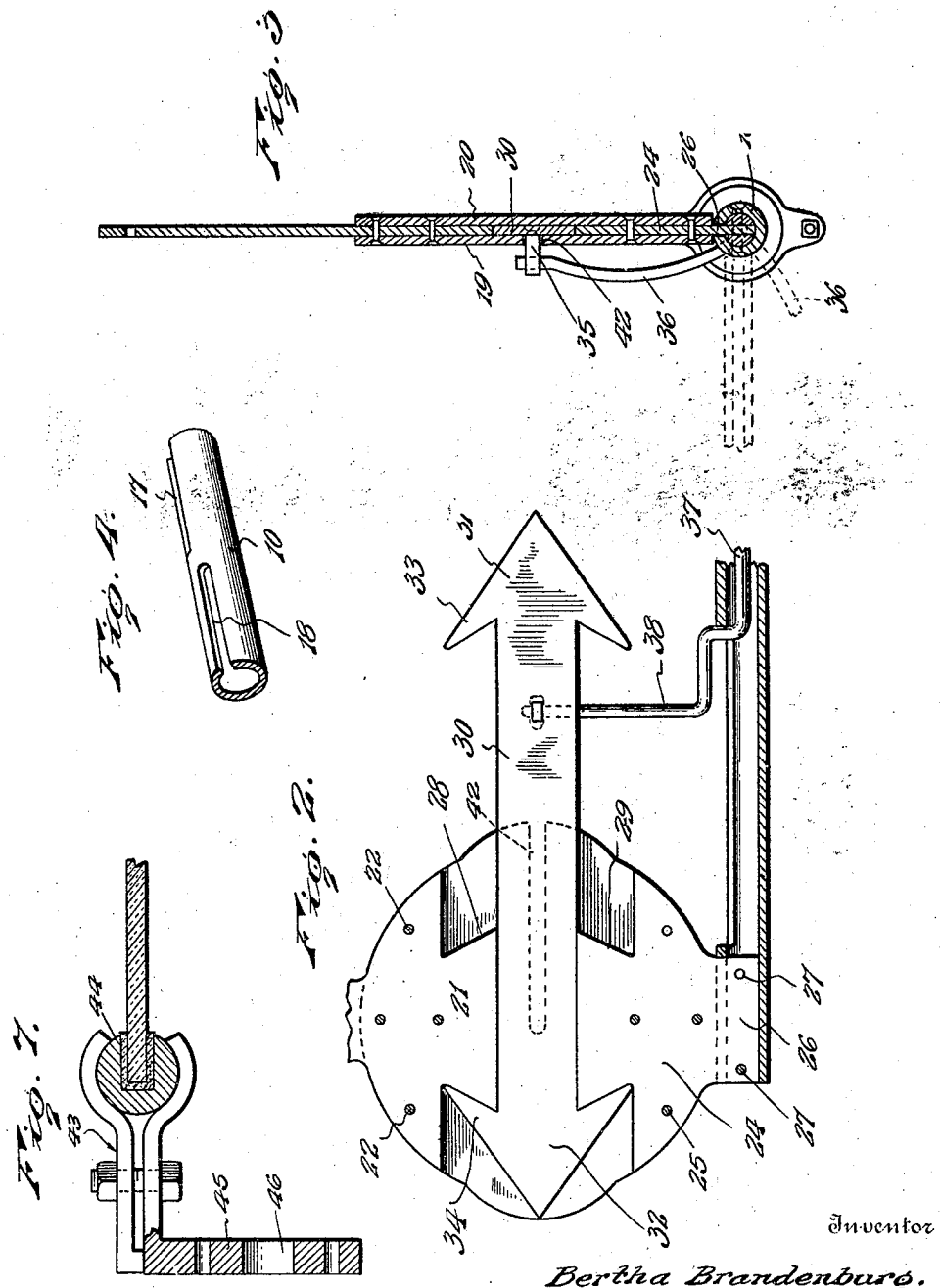

Patented Jan. 1, 1929.

1,697,411

UNITED STATES PATENT OFFICE.

BERTHA BRANDENBURG, OF ESCANABA, MICHIGAN.

DIRECTION INDICATOR FOR MOTOR VEHICLES.

Application filed April 19, 1928. Serial No. 271,286.

The present invention is directed to improvements in direction indicators for motor vehicles.

The primary object of the invention is to provide a device of this character so constructed that the direction of travel of the vehicle equipped with the device can be indicated to the drivers of following or approaching vehicles.

Another object of the invention is to provide a device of this character so constructed that it can be conveniently operated by the driver, thus eliminating the necessity of using the hands, as now customary, and is objectionable, especially in closed types of vehicles.

Another object of the invention is to provide a device of this character which is simple in construction and operation, light, ornamental, compact, and one which can be conveniently attached to a vehicle.

In the accompanying drawings:

Figure 1 is a rear elevation, partly in section, showing the same in place upon a vehicle.

Figure 2 is a view showing one of the plates removed to more clearly illustrate the manner in which the indicating arrow is mounted.

Figure 3 is a section on the line 3—3 of Figure 1.

Figure 4 is a detail perspective view of a portion of the tube.

Figure 5 is a fragmentary side view of one of the bearing plates.

Figure 6 is a sectional view on the line 6—6 of Figure 5.

Figure 7 is a detail sectional view showing a clamp used for attaching the device to the windshield of a touring car.

Referring to the drawings, 1 designates one of the corner posts of an automobile of the closed type and in which is formed an opening 2, and bolted upon opposite sides of the post 1 are plates 3 and 4, there being felt packings 5 between the respective plates and the post to protect the finish of the post when the device is in place thereon. The plate 4 is provided with shoulders 6 and is also provided with a circular enlargement 7 which is engaged in the recess 8 of the collar 9, said collar being retained on the tube 10 by a set screw 11. This clamping collar carries a pin 12 which is adapted to engage the shoulders of the plate 4 to limit the rotary movement of the tube 10.

The plate 3 has a socket 13 formed therein for seating the inner end of a coil spring 14, said coil spring having its outer end bearing against the collar 15, said collar being retained in fixed position upon the tube 10 by a set screw 16, and since said spring encircles the tube 10 it will aid in maintaining the same against rattling.

Upon reference to Figure 1, it will, of course, be observed that the tube 10 is rotatable in suitable openings formed in the plates 3 and 4.

The tube 10 is provided with a longitudinal slot 17, and a non-alined slot 18, the purpose of which will appear later.

The signal per se consists of front and rear plates 19 and 20 which are of general circular form and are held spaced at their upper ends by a filler plate 21 which is secured between the plates by rivets or other suitable securing devices 22.

The upper end of the filler plate 21 has formed integral therewith a plate 23 which is merely for the purpose of ornamenting the signal to give the same a finished appearance.

A lower filler plate 24 is employed and is engaged between the lower ends of the plates 19 and 20 and is also secured therebetween by rivets or other suitable securing devices 25, said plate having an extension 26 which is adapted to fit in the slot 18 of the tube 10 and is held in place by bolts or rivets 27.

It will be observed that the ends of the filler plates 21 and 24 are provided with inclined shoulders 28 and 29 respectively, the purpose of which will appear later.

The movable indicator 30 is in the form of a double-ended arrow, the heads 31 and 32 thereof being provided with extensions 33 and 34 respectively, which are adapted to engage the respective shoulders 28 and 29 in order to limit the sliding movement of the arrow in opposite directions.

Near one end of the arrow is fixed a block 35 and in which is engaged the upper end of the arm 36 of the rod 37, said rod having an offset intermediate portion 38 which is adapted to slide in the slot 17, said rod being movable in the tube 10 and is centralized therein by a screw plug 39 mounted in the inner end thereof, said rod having a ball handle 40 upon its inner end to facilitate the operation thereof.

The inner end of the tube 10 has threaded thereon the handle 41 which serves to rotate the tube in order that the indicator can be moved from a horizontal position to a vertical position, or vice versa.

As shown in Figures 1 and 2, the arrow is in the position to indicate that the driver of the automobile intends to make a right hand turn, and at which time the indicator is in its vertical position in order that the arrow can be readily discernible. If the driver contemplates making a left hand turn, it will, of course, be understood that the rod 37 is moved outwardly in order that the head 32 of the arrow will project from the left hand side of the indicator. The rear plate has painted thereon in contrasting color the word Turn which will indicate the purpose of the arrow. The front plate 19 is provided with a horizontal slot 42 to accommodate the block 35 when the arrow is slid to the left.

Owing to the presence of the handle 41 it will be obvious that the tube 10 can be rotated in order that the indicator will be swung to a vertical or horizontal position, the pin 12 limiting the swinging movement thereof as it engages the lowermost shoulder of the plate 4. The indicator is normally maintained in a horizontal position and as the driver approaches a corner and desires to make a turn, the rod 37 is slid according to the direction in which the turn is to be made so that the arrow will be properly positioned, after which the handle 41 is grasped and the tube turned so that the indicator will swing to a vertical position with the arrow pointing in the direction in which the turn is to be made.

If the driver intends to stop, the arrow is maintained in position as shown in Figures 1 and 2, whereupon the driver will turn toward the curb or side of the road and since the arrow is pointed to the right it will indicate to following drivers that it is intended that the vehicle is to stop, especially in view of the fact that the vehicle is in the middle of certain boundaries.

In Figure 7 a clamp 43 is illustrated for engagement with the side rail 44 of a windshield of an open or touring car. One section of the clamp has a plate 45 carried thereby and provided with a contact opening 46 for receiving the tube 10, said tube being retained in place in the same manner and by the same means as shown in Figure 1.

What I claim is:

1. A device of the class described comprising a tube for attachment to a motor vehicle, an indicator supported by the tube and having an arrow slidably connected therewith, means in the tube for sliding the arrow, and means for rotating the tube to move the indicator from a vertical position to a horizontal position as and for the purpose set forth.

2. A device of the class described comprising a tube for attachment to a motor vehicle, an indicator comprising a pair of spaced plates, an arrow slidable between the plates, a rod slidable in the tube and connected with the arrow for sliding the same upon imparting sliding movement to the rod, means for rotating the tube to move the indicator from a horizontal to a vertical position, and means between the plates for limiting the sliding movement of the arrow.

3. A device of the class described comprising a tube for attachment to a motor vehicle, means for rotating the tube, means for limiting the rotary movement of the tube, an indicator comprising a pair of plates, filler plates engaged between the plates to maintain the same in spaced relation, an arrow slidable in the space between the plates, a rod slidable in the tube and having one end connected with the arrow to slide the arrow when sliding movement is imparted to the rod, said rod being rotatable in the tube and means carried by the filler plates to limit the sliding movement of the arrow.

4. A device of the class described comprising a tube adapted for attachment to a motor vehicle, said tube having a longitudinal slot formed therein, a rod slidable in the slot and having an offset portion for engagement in said slot, an indicator including spaced plates, means for attaching the plates to the tube, an arrow slidable between the plates and connected with the rod, a handle carried by the tube for rotating the same, and means for limiting the rotary movement of the tube.

In testimony whereof I affix my signature.

BERTHA BRANDENBURG. [L. S.]